(12) United States Patent
Pison

(10) Patent No.: US 11,432,173 B2
(45) Date of Patent: Aug. 30, 2022

(54) RADIO SCANNER MOUNTED IN A RADIO-COMMUNICATION SYSTEM MOBILE STRUCTURE

(71) Applicant: Air Lynx, Les Ulis (FR)

(72) Inventor: Laurent Pison, Jouars Pontchartrain (FR)

(73) Assignee: BULL SAS, Les Clayes-sous-Bois (FR)

( * ) Notice: Subject to any disclaimer, the term of this patent is extended or adjusted under 35 U.S.C. 154(b) by 225 days.

(21) Appl. No.: 16/728,649

(22) Filed: Dec. 27, 2019

(65) Prior Publication Data

US 2020/0213885 A1 Jul. 2, 2020

(30) Foreign Application Priority Data

Dec. 30, 2018 (FR) .................................... 1874392
Apr. 2, 2019 (EP) .................................... 19305433

(51) Int. Cl.
*H04W 24/08* (2009.01)
*H04W 76/10* (2018.01)
*H04W 72/04* (2009.01)

(52) U.S. Cl.
CPC ....... *H04W 24/08* (2013.01); *H04W 72/0453* (2013.01); *H04W 76/10* (2018.02)

(58) Field of Classification Search
None
See application file for complete search history.

(56) References Cited

U.S. PATENT DOCUMENTS

| 9,167,539 B2* | 10/2015 | Michel | H04W 52/245 |
| 9,473,981 B2* | 10/2016 | Bhushan | H04W 48/10 |
| 2011/0223877 A1 | 9/2011 | Tillman et al. | |
| 2012/0300694 A1* | 11/2012 | Watanabe | H04B 7/14 370/315 |
| 2016/0219475 A1* | 7/2016 | Kim | H04W 76/28 |

FOREIGN PATENT DOCUMENTS

WO 2012003566 A1 1/2012

* cited by examiner

*Primary Examiner* — Chi H Pham
*Assistant Examiner* — Raul Rivas
(74) *Attorney, Agent, or Firm* — ARC IP Law, PC; Joseph J. Mayo

(57) ABSTRACT

A mobile structure (101) of a radio-communication system is disclosed, comprising a mounted radio scanner (103) using means for measuring radiofrequency signals integrated in its radio equipments (104, 106a-106b) or in a specific device for measuring the radiofrequency signals emitted in its immediate environment (105) and for enabling the detection and possible identification of at least one other third-party structure (112) located in this immediate environment.

12 Claims, 1 Drawing Sheet

RADIO SCANNER MOUNTED IN A RADIO-COMMUNICATION SYSTEM MOBILE STRUCTURE

CROSS-REFERENCE TO RELATED APPLICATIONS

This application claims the benefit of French Patent Application No. 1874392 filed Dec. 30, 2018 and European Patent Application No. 19305433.5 filed Apr. 2, 2019, the disclosures of which are herein incorporated by reference in its entirety.

This invention relates, in general terms, to mobile radio-communication systems based on LTE cellular technology. In particular, it relates to a radio scanner mounted in a radio-communication system mobile structure.

Prior Art

Mobile telecommunications networks, such as cellular networks based on the LTE (Long Term Evolution) standard as defined by the 3GPP consortium and its LTE-A (Advanced LTE) evolution, enable high-speed communications between mobile terminals, with low latency and high tolerance to the relative roaming of the various mobile entities comprising the network. The architecture of these networks is generally based on a set of base stations, called eNodeB (evolved Node B) in the LTE standard, which are fixed network nodes comprising the radio part of the network, called eUTRAN in the LTE standard, and which establish wireless communications with mobile terminals, called UEs (User Equipments) in the LTE standard, through a specific radio interface, called Uu interface in the LTE standard. The radio part of an LTE network consists of the eNodeBs, local or remote antennas, fiber optic links to the remote antennas (for example CPRI—Common Public Radio Interface) and IP (Internet Protocol) links connecting the eNodeBs to each other (X2 interface) and to the core network (S1 interface).

The LTE standard is compatible with the mobile cell concept, whereby a base station can itself be mobile, as installed in a mobile structure (for example a fire engine, or a security force command-car vehicle, for example), in order to be able to project an LTE cell anywhere in a territory that is capable of serving a group of LTE mobile communication terminals used by police, fire brigade, etc., in order to provide a mobile communications network.

However, when moving an eNodeB and more generally a mobile cell, the frequency spectrum used to communicate with its mobile communication terminals may conflict with frequency spectra used by third-party structures. Additionally, when establishing a backhaul data transport link which directly connects the radio equipment of several mobile structures to each other, it is necessary to know certain information relating to the other entities with which such a link may be established, in order to initiate the establishment and/or allow the proper operation of the link.

Thus, there is a need for a mobile structure comprising a base station and capable of determining information on the use of a frequency spectrum by third-party structures operating in its close environment.

Technical Problem

The purpose of this invention is to remedy the disadvantages of the prior art. In particular, this invention is intended to provide a communication system mobile structure capable of determining information associated with the use of a frequency spectrum by a third-party radio transmission structure. The purpose of such a structure is to determine the radiofrequency resources used by all the radio equipment located in the immediate environment of the mobile structure and, where appropriate, to identify a third-party structure with which a backhaul data transport link can be established.

This invention further aims to propose a radio-communication system comprising such a mobile structure as well as a method of using a radio scanner mounted in said mobile structure.

BRIEF DESCRIPTION OF THE INVENTION

For this purpose, a first aspect of this invention relates to a radio-communication system mobile structure having at least one base station which is adapted to establish cellular communication links with mobile communication terminals, through a specific radio interface, in a specific frequency spectrum, the mobile structure comprising a mounted radio scanner having means for measuring a radiofrequency signal transmitted in the specific frequency spectrum, by at least one third-party structure located in the immediate environment of the mobile structure, and being configured to determine, based on physical properties of the measured radiofrequency signal, information associated with the use of the specific frequency spectrum for radio transmissions transmitted by the third-party structure.

This invention thus allows to detect the presence of a third-party structure, to determine the distance from this third-party structure, to determine the radiofrequency resources used by all the radio equipment located in the immediate environment of the mobile structure and finally, to identify, if appropriate, a third-party structure with which a backhaul data transport link can be established. Advantageously, the information associated with the use of the specific frequency spectrum for radio transmissions emitted by the third-party structure can be used to decide whether or not to initiate, and if necessary, to manage, the establishment of a backhaul data transport link between the mobile structure and the third-party structure.

Thanks to this invention, a mobile structure capable of establishing such a link is able to determine whether or not a third-party structure, with which it could establish a data transport link, is within range of its own radio equipment. In other words, the mobile structure has means enabling it to know whether a third-party structure is entering or leaving an area, which is located in its immediate environment, and in which said third-party structure is eligible for the establishment of a backhaul data transport link.

Furthermore, the mobile structure which establishes a data transport link is also capable, thanks to this invention, of determining whether the third-party structure with which it establishes this link is moving away from it, is approaching it or remaining at a constant distance from it. This allows on the one hand, for the setting up of the data transport link to be optimized taking account of this distance and, on the other hand, for the parameters of this link (such as radio signal strength) to be adapted to the actual distance which separates the mobile structure from the third-party structure.

Secondly, when a third-party structure capable of establishing such a link is detected in the environment of the mobile structure, this invention allows to identify this third-party structure. In particular, when the mobile structure is mounted in a first vehicle and when the third-party structure is a radio equipment mounted in another vehicle, the identification may then condition any establishment of a backhaul data transport link between the two vehicles. In fact, depending on whether the second vehicle is a friendly, an enemy or a neutral vehicle, the establishment of a backhaul data transport link may or may not be desirable.

Finally, the implementation of this invention allows to take into account information which is important for the establishment of a high-performance backhaul data transport link, such as information related to the frequency spectrum use by the various radio equipment operating in the immediate environment of the mobile structure. Indeed, the communications between a base station and its cells mobile terminals are implemented in a specific frequency spectrum. This frequency spectrum, typically a frequency band standardized according to the 3GPP consortium's LTE standard, comprises at least one frequency band with a specific center frequency and spectral width. When this frequency spectrum is used for several communications at the same time, it is necessary to distribute the available useful frequencies as efficiently as possible between the different communications in order to optimize the performance of each of them and to avoid or limit the occurrence of interference. However, this frequency spectrum can be used for the communications between each base station on each mobile structure and its cell s terminals and also for the establishment of a backhaul data transport link between several mobile structures.

In other words, optimal operation of a link of this type implies an optimized distribution of the radio resources used by all the radio equipment in the immediate environment of the mobile structure. However, optimal distribution is based on precise knowledge of the use of the frequency spectrum by all the radio equipments in the immediate environment of the mobile structure and likely to use all or part of this spectrum. This invention therefore enables a control entity to manage the use (including allocation) of radio resources in the spectrum based on the information obtained from the scanner.

According to other optional characteristics of a mobile structure in accordance with this invention:

- the physical properties of the measured radiofrequency signal include the measured radiofrequency signal strength and frequency characteristics, such as its center frequency and spectral width. This advantageously allows to optimize the management of radio resource allocation.
- the information associated with the use of the frequency spectrum by the third-party structure comprises the entry or exit of the third-party structure into or out of the immediate environment of the mobile structure; the movement of the third-party structure away from or towards the mobile structure; and, the frequency band (s) of the frequency spectrum that is(are) used by the third-party structure. These characteristics allow for optimal management of the allocation of radio resources for optimal operation of the mobile structure and the third-party structure.
- the information associated with the use of the specific frequency spectrum is specific for radio transmissions transmitted by a base station of the third-party structure. Thus, in this case, the third-party structure has a base station which is preferably not connected to the base station of the mobile structure.
- the mounted radio scanner measuring means are configured to measure the radiofrequency signal emitted by a radio relay transmitting mainly on the DL (Down-link) spectrum.
- the mounted radio scanner measurement means are configured to measure the radiofrequency signal on radio resources not used by cellular communication links with mobile communication terminals. Thus, this allows to reduce the interferences in the measurement of radio transmissions emitted by the third-party structure.
- the specific frequency spectrum is a frequency band adapted to the LTE system of the 3GPP consortium, which can thus be used for data transmission through Wi-fi and/or Wimax type technologies.
- the means for measuring a radiofrequency signal transmitted in the frequency spectrum comprise means integrated into the base station of the mobile structure. In particular, the means for measuring a radiofrequency signal comprise a radio processing chain and antennas associated with the base station of the mobile structure. This allows the mounted radio scanner to have high-performance equipment without any additional cost. Alternatively, the means for measuring a radiofrequency signal emitted in the frequency spectrum comprise measurement means specific to the mounted radio scanner.
- it further comprises the means for identifying a third-party structure located in the immediate environment of the mobile structure, said identification means being configured to identify, based on information contained in the measured radiofrequency signal, the third-party structure emitting a radiofrequency signal measured by said radio scanner measurement means. This advantageously allows to detect and identify a frequency spectrum, as well as a technology involved in data transmission, such as 3M LTE, 10 MHz LTE, 20 MHz Wi-fi, among other technologies.
- the information contained in the radiofrequency signal measured by the radio scanner measurement means and used by the identification means comprises a Cell-ID identifier associated with a base station of another mobile structure, and/or a PLMNid identifier associated with a mobile communication terminal of another mobile structure. These characteristics allow to determine the identity of a network and a cell, by a radio scanner, on a third-party structure.
- It further comprises the recognition means configured to recognize, based on the information contained in the radiofrequency signal measured by the mounted radio scanner measurement means, technological characteristics of the radio transmission performed by the third-party structure such as the modulation format used, the radio interface used, and/or the protocol used for said radio transmission.
- the mounted radio scanner is configured to transmit to a control entity of the mobile structure, information associated with the use of the frequency spectrum, for radio transmissions, by the third-party structure. Thus, the information can be processed and used to modify the configuration of cellular communication links with mobile communication terminals. Furthermore, this information can be used to control the change of the frequency band(s) used by the radio equipment of the mobile structure for their radio-communications and thus avoid interference with the radio-communications of a third-party mobile structure.
- the control entity of the mobile structure, is configured to identify free radio resources, such as a new frequency spectrum with a width less than the specific frequency spectrum, not used by the third-party structure. Free radio resources can, for example, correspond to frequency bands not used by the third-party structure.

the control entity of the mobile structure, is configured to reset the cellular communication links with the mobile communication terminals to use at least part of the free radio resources. In particular, the cellular communication links with the mobile communication terminals will use only free radio resources. Thus, the controlling entity uses this information before establishing a new data transport link to allocate the optimum radio resources to that link. Thus, there will be less or no interference with the communications of the third-party structure.

the control entity of the mobile structure, is configured to allocate part of the free radio resources to the establishment of a backhaul data transport link connecting the mobile structure to the third-party structure. In particular, the free radio resources allocated to the backhaul are different from the free radio resources allocated to the cellular communication links with the mobile communication terminals.

the control entity of the mobile structure, is configured to identify the radio resources used by the third-party structure and to reset the cellular communication links with the mobile communication terminals so as not to use the radio resources used by the third-party structure.

the control entity of the mobile structure, is configured to identify the radio resources used by the third-party structure, to identify the network used by the third-party structure (e.g. PLMNid) and to conFigure the mobile communication terminals in order to stop any transmission of a radiofrequency signal.

According to another aspect, this invention relates to a radio-communication system comprising a mobile structure according to this invention and at least one third-party structure, said third-party structure being a mobile third-party structure. Indeed, it is possible for the third-party structure to be mobile and to enter or exit the range of the mobile structure while in a stationary state.

According to another aspect, this invention relates to a method of using a radio scanner of a mobile structure according to this invention, said method comprising the steps of measuring a radiofrequency signal emitted in the frequency spectrum, by at least one third-party structure, located in the immediate environment of the mobile structure and, determining, based on physical properties of the measured radiofrequency signal, information associated with the use of the specific frequency spectrum, for radio transmissions emitted by the third-party structure.

According to further optional characteristics of a method for using a radio scanner according to this invention:

it further comprises the following preliminary step, implemented by a control entity of the mobile structure: interruption of radio-communications between the base station of the mobile structure and the mobile communication terminals of the mobile structure. Nevertheless, this may have an impact on the mobile communications service, as it is necessary to interrupt them at once in order to carry out the measurements. Thus, preferably, the method further comprises the following step, implemented by a control entity of the mobile structure: allocation of radio resources dedicated to the mounted radio scanner, said radio resources dedicated to the mounted radio scanner not being used by the radio-communications between the base station of the mobile structure and the mobile communication terminals of the mobile structure.

it further comprises the following step: transmission to the controlling entity of the mobile structure of information associated with the use of the frequency spectrum, for radio transmissions emitted by the third-party structure.

it further comprises the following step: identification by the control entity of the mobile structure of free radio resources, such as a new frequency spectrum with a width less than the specific frequency spectrum, not used by the third-party structure.

Other advantages and characteristics of this invention will become evident when reading the following description given as an illustrative and non-limiting example, referring to the Figures in the appended drawings, wherein.

Figure 1:
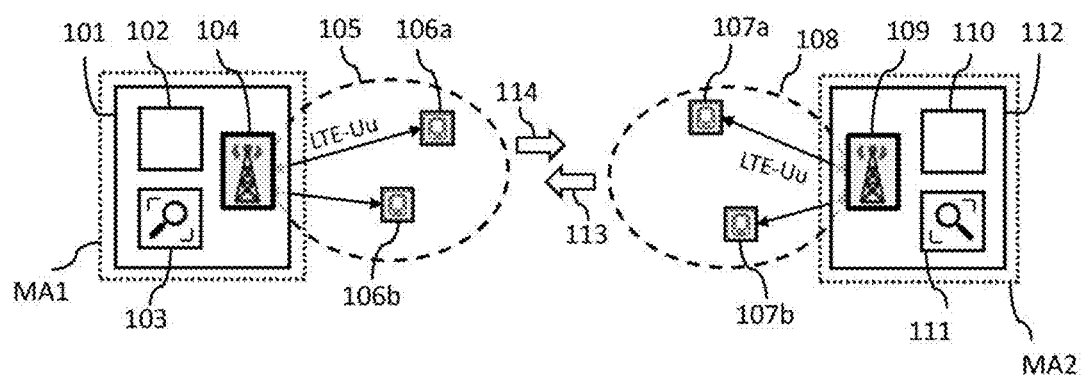
FIG. 1 is a block diagram depicting an embodiment of a radio scanner mounted in a mobile structure according to this invention.

In the Figures, the flow diagrams and the block diagrams depict the architecture, functionality and operation of possible implementations of systems and methods according to various embodiments of this invention. In this respect, each block in the flow diagrams or block diagrams may represent a system, device, module or code, which comprises one or more executable instructions to implement the specified logical function(s). In some implementations, the functions associated with the blocks may appear in a different order than that shown in the Figures. For example, two blocks shown in succession may, in fact, be executed substantially simultaneously, or the blocks may sometimes be executed in the reverse order, depending on the functionality involved. Each block in the block diagrams and/or flow diagrams, and combinations of blocks in the block diagrams and/or flow diagrams, may be implemented by special hardware systems that perform the specified functions or execute or perform combinations of special hardware and computer instructions.

DESCRIPTION OF THE INVENTION

In the following described embodiments and in the appended drawings, the same or similar elements shall bear the same numerical references to the Figures.

In the following description, the term "mobile structure" means an entity that includes means for cellular communications with mobile user terminals belonging to the mobile structure. The "mobile structure" may be mounted in a "docking support". Such a docking support corresponds to any means capable of accommodating a mobile structure according to this invention. By way of non-limiting examples, a docking support may be selected from: nomadic campsites or vehicles such as land vehicles, air vehicles or water vehicles, said docking support being equipped with the mobile structure according to this invention. A docking support may also consist of an infrastructure not having the capacity to move (campsite), arranged to accommodate a mobile structure in accordance with this invention.

The term "radio scanner" means a tool for detecting and identifying, in the spectrum under consideration, a use (transmission) of such spectrum by a radio device which does not belong to the mobile structure but which is of the same technology, in particular LTE technology, in the context of the embodiments to be considered.

The term "third-party structure" or "third-party mobile structure" means any radio equipment of another structure, possibly mobile, such as a base station, mobile terminal or dedicated user equipment, capable of establishing a data transport link with the radio equipment of the mobile structure concerned. A mobile structure may be mobile or stationary (i.e., static). It is generally nomadic (i.e., alternating between mobility phases and stationary phases).

The term "backhaul network", or "backhaul", is used in the context of mobile networks such as LTE to refer to the network and data transport links between the core network and the base stations of the radio part of the mobile network. It is an intermediate network that allows the transmission and reception of data between the base stations that act as a subscriber connection equipment (i.e., mobile users) and the core network. These exchanges are implemented using the IP Protocol (Internet Protocol). In fixed or mobile telecommunications networks, the backhaul network makes extensive use of fiber optics for data transport.

Furthermore, the term "immediate environment" herein refers to a geographical area surrounding the mobile structure in question, the extent of which corresponds approximately to that of the radio coverage area of the base station on said mobile structure, i.e. the extent of the mobile cell of said mobile structure. The area covered by such a range may depend on the strength associated with a radio equipment and the height at which it is located. As an example, a radio equipment of a ship may be fixed on a mast. It is then possible that an immediate environment within the range of a radio equipment of the order of several tens of kilometers, for a radio equipment with a strength of a few tens of Watts fixed at a height of twenty meters.

By "physical properties it should be understood as, for example, the signal strength as a function of frequency. It also refers to the strength and frequency characteristics of the measured radiofrequency signal. Moreover, the person skilled in the art will understand that these physical properties can be any property of the signal that can be used to determine information associated with the use of the frequency spectrum by a third-party mobile structure.

In the context of the use of a radio-communication system mobile structure, it may be necessary to rapidly measure a radiofrequency signal emitted by a third-party structure. In this context, the inventors have developed a mobile structure that allows determining information associated with the use of a given frequency spectrum for radio transmissions emitted by a third-party structure.

Referring to the diagram in FIG. 1, a method for making a radio scanner mounted in a mobile structure according to this invention is first described.

In the example shown in FIG. 1, two mobile structures 101 and 112 are each equipped with base stations 104 and 109, control units 102 and 110 and radio scanners 103 and 111. In the example described in connection with FIG. 1, the mobile structures 101 and 112 are mounted in the docking supports MA1, MA2, said docking supports consisting of a separate vehicle, respectively. However, the example shown in FIG. 1 is not exhaustive, and the person skilled in the art will understand that this invention can be applied to a number of mobile structures greater than or equal to two, each of said mobile structures being able to be included or mounted in a fixed or movable docking support.

The base stations 104 and 109 are, for example, the entities called eNodeB (evolved Node B) as commonly used in mobile radio-communications networks based on the 3GPP consortium's LTE standards. In a manner known to the person skilled in the art, and in accordance with the LTE standards, they are the gateway between the core LTE IP-based data transport network and the mobile communication terminals, or the UEs (User Equipments) 106a, 106b and 107a, 107b, on the other hand. In particular, the eNodeBs serve geographical areas defined by the extent of their radio coverage. These geographical areas form radio cells 105 and 108 within which radio-communications are established between each eNodeB and mobile terminals (i.e. UEs) 106 and 107 which are connected to it by cellular communication links.

Additionally, an eNodeB can, in certain embodiments, serve several cells. In this case, the eNodeB in question consists of several antennas, each providing radio coverage for a specific geographical area. Advantageously, yet not restrictively, a radio scanner can be associated with said several cells served by the eNodeB. In a particular embodiment, a radio scanner can be associated with each of said cells served by the eNodeB. The total radio coverage of the eNodeB is subdivided into angular sectors respectively associated with a particular antenna. For example, in a vehicle, the eNodeB in the vehicle may cover four separate angular sectors, each of 90°, which provide radio coverage in all directions from the vehicle. Alternatively, or in addition, a vehicle eNodeB may cover three separate angular sectors, each of 120°. Preferably, a vehicle's eNodeB can cover a single angular sector of 360°.

For readability purposes, the two cells shown in FIG. 1, together with eNodeB 104 and eNodeB 109, respectively, comprise only two UEs each. However, the person skilled in the art will understand that the number of mobile terminals present in each cell may obviously be more than two. Additionally, eNodeBs 104 and 109 use air interfaces, such as the LTE-Uu air interface commonly used in mobile radio networks based on LTE standards, to establish their cellular communication links with all the UEs in the cell they serve.

Control entities 102 and 110 manage and control the use of the radio resources made by the radio equipment (base stations and terminals) of each mobile structure, respectively. In particular, in embodiments of the method according to this invention, these control entities can use all the information obtained through the radio scanner to control the establishment of backhaul data transport links between different structures, as well as the distribution of the radiofrequency resources available for each radio equipment concerned. These control entities 102 and 110 can be components of a functionally unique control entity, the implementation of which is distributed in mobile structures 101 and 112, respectively. Alternatively, the implementation of their function may also be distributed within several physical equipments, such as a plurality of base stations, and optionally base stations belonging to separate mobile structures.

In the example shown in FIG. 1, as symbolically illustrated by arrows 113 and 114, mobile structures 101 and 112 are in motion, specifically moving towards each other. The distance between the two mobile structures becomes shorter over time, and consideration is given to the moment when mobile structure 112 is about to enter the immediate environment of mobile structure 101, i.e. within the radio range of the radio equipment on mobile structure 101. In general, this invention applies whether the mobile structures are moving or not, and whether they are already within radio range of each other or not.

Additionally, this invention addresses situations where the two mobile structures 101 and 112 are together at distances exceeding the radio range of base stations mounted with fixed network equipment. They are therefore capable of establishing a backhaul data transport link between them to create an alternative backhaul network. For example, two ships navigating on the high seas may establish a backhaul data transport link between some of their respective radio equipment for the exchange of data between them by radio without interconnection with a fixed network core.

The two radio scanners 103 and 111, respectively mounted on mobile structures 101 and 112, allow obtaining information relating to the other mobile structure. This concerns, in particular, information associated with the use of the frequency spectrum by this other mobile structure. Control entities 102 and 110 can then use this information to decide whether or not to initiate and, if necessary, to manage the establishment of a backhaul data transport link between these mobile structures.

Furthermore, as indicated below, the information obtained through the radio scanners allows more generally, to optimize the management of radiofrequency resources for all the radio equipment of the system located in the same environment (i.e. in the immediate environment of the mobile structure which includes the scanner). This is true whether or not the radio equipment in question is involved in a backhaul data transport link.

Additionally, the information obtained through the radio scanner may also be used for purposes other than backhaul, for example, to optimize the distribution of radiofrequency resources between different angular sectors associated with the same base station.

Each radio scanner 103 and 111 comprises means for measuring the radiofrequency signal transmitted in a specific frequency spectrum. This frequency spectrum is, for example, the frequency band standardized according to the LTE standard which is used by the base station of the mobile structure to establish cellular communication links with the mobile communication terminals of its cell. The width of such a frequency band can vary from 1.4 MHz to 20 MHz in a frequency range from 450 MHz to 3.8 GHz. However, such a frequency range is given as an non-limiting example and could, depending on the context of use, be less than 450 MHz. Alternatively, or complementarily, the frequency spectrum may include frequency bands above 3.8 GHz and, in particular, above 22 GHz in the context of the implementation of 5G networks. It may also be the frequency spectrum specifically associated with a mobile terminal of the radio scanner mobile structure. Additionally, the radiofrequency signal measured is a radiofrequency signal emitted by at least one third-party mobile structure which is located in the immediate environment of the mobile structure in which the scanner is mounted.

In the example shown in FIG. 1, the measuring means are, or comprise, means of a radiofrequency signal measuring device that includes at least a receiving antenna and a processing unit. The antenna enables the reception of a radiofrequency signal and the processing unit enables the physical properties of the radiofrequency signal received by the antenna to be specific. In particular, the processing unit determines this radiofrequency signal strength and frequency characteristics which are the center frequency and the spectral width of each frequency band included in the signal. Generally, the measuring device comprises any means capable of picking up a radiofrequency signal emitted in a given environment and of extracting certain physical characteristics from the picked-up signal. Advantageously, such a measuring device can measure the strength level, for example through an RSSI (Radio Signal Strength Indicator), the center frequency and the bandwidth of the radiofrequency signal emitted in a given frequency spectrum, regardless of whether or not this frequency spectrum is used by the radio equipment of the mobile structure. It can thus allow identifying parts of a frequency spectrum (i.e. frequency bands) that are not being used.

In another embodiment of this invention, the means for measuring the radiofrequency signal are, or comprise, means integrated into the base station of the mobile structure. For example, the radiofrequency signal is picked up by a transceiver antenna of the base station and processed by a processing unit of the base station to recover its properties. Advantageously, such an embodiment allows measuring all the radiofrequency signals specifically emitted in the frequency spectrum used by the base station. Furthermore, in the case where the base station is equipped with several antennas covering several angular sectors, each antenna can be used to constitute means for measuring the radiofrequency signal emitted in its radio coverage area.

Finally, in another embodiment of this invention, the means for measuring the radiofrequency signal are, or comprise, means of at least one mobile communication terminal of the mobile structure. For example, the transmitter-receiver antenna of the terminal detects a radiofrequency signal transmitted in its environment and a processing unit of said mobile communication terminal determines the properties of this signal. Advantageously, such an embodiment allows to measure all radiofrequency signals transmitted in the frequency spectrum or in frequency bands of this spectrum used by the mobile communication terminal concerned. Additionally, the area covered by the measuring means is the radio range of the mobile communication terminals and can therefore be significantly large. Finally, several mobile communication terminals may measure radiofrequency signals in parallel in different frequency bands and/or geographical areas.

In all embodiments of this invention, the radio scanner is configured to determine, based on physical properties of the measured radiofrequency signal, information associated with the use of the frequency spectrum for radio transmissions by the third-party mobile structure.

For example, by means of the frequency characteristics of the measured radiofrequency signal, the radio scanner can determine the frequency band or bands of the specific frequency spectrum used by the third-party mobile structure for its radio transmissions. More concretely, the radio scanner recognizes, from a detected radiofrequency signal, the frequency band(s) used by the base station of a third-party mobile structure located in its immediate environment to communicate with the mobile terminals of its cell. Advantageously, the controlling entity of a mobile structure can use this information before establishing a data transport link to allocate the optimum radio resources to this link.

In another example, through the radio signal strength measured as a function of frequency, the radio scanner can determine whether the detected third-party mobile structure is entering or exiting its immediate environment. For example, such information can be obtained by observing the evolution over time of the noise level of the measured frequency signal, or by comparing it with one or more threshold values considered to be associated with the boundary of that area (i.e. the immediate environment of the mobile structure). Alternatively, the presence of interference (i.e. beats in the measured radiofrequency signal) in the radiofrequency signal used by the base station of the mobile structure for its communications may also indicate the presence of a third-party mobile structure, using the same radiofrequency radio resources and located in the immediate environment of the mobile structure. Such interference may in particular be due to the presence of a "friendly" third-party structure, such as for example one vehicle among a plurality of vehicles forming a fleet of vehicles, or an "external" third-party mobile structure, such as for example an undetected third-party vehicle not forming part of a fleet of vehicles, and, using the same radiofrequency resources, such use may be intended for the transmission of communications jamming signals. Advantageously, a control entity of a mobile structure can use this information to control the change of the frequency band(s) used by its radio equipment for their radio-communications and thus avoid interference with the radio-communications from another mobile structure or with another mobile structure.

In the same way, the measured radiofrequency signal strength can be used to determine the distance or approach of the third mobile structure from the radio scanner measurement means. This is because the strength of the signal picked up at a receiving antenna of the radio scanner increases as the distance between the mobile structure and the third mobile structure decreases and conversely it decreases as the distance increases.

In a particular embodiment of this invention, the radio scanner also includes means for detecting and identifying a third mobile structure located in the immediate environment of the mobile structure. For example, the radio scanner can retrieve, from the data contained in a measured radiofrequency signal, a Cell-ID type identifier associated with a cell of a base station of a third-party mobile structure or a PLMNid type identifier associated with a mobile communication terminal of a third-party mobile structure. Additionally, any type of data, included in the measured radiofrequency signal, and allowing identification can be used. For example, a MAC address or a SIB system information block. This type of identification data is per se known to radio equipment such as a mobile structure and can therefore be easily retrieved within a measured signal. Advantageously, such identification allows determining whether or not a backhaul data transport link can be established with a detected mobile structure, with regard to safety considerations. Typically, it is thus possible to know whether a third mobile structure is a friendly, an enemy or a neutral mobile structure or even whether this mobile structure is already part of a network formed with, or stored in, a memory on the mobile structure.

Finally, in a particular embodiment of this invention, the radio scanner can also recognize, based on the properties of the radiofrequency signal, so-called technological characteristics of the radio transmission implemented by the third mobile structure. For example, the radio scanner can recognize the modulation format used for the detected radio transmission (for example the OFDMA format or the SC-FDMA format), the radio interface used for this transmission (for example the LTE-Uu interface or the LTE-Un interface) or the protocol or standard used for this radio transmission (for example 3G, 2G or wifi). In addition, advantageously, such a recognition also allows to identify a radio transmission which is implemented through dedicated user equipment and which does not use any known format or protocol.

As mentioned, according to this invention, the mounted radio scanner measurement means are configured to measure the radiofrequency signal on radio resources not used by cellular communication links with mobile communication terminals and the controlling entity can manage the allocation of radio resources in the spectrum based on the information obtained thanks to the scanner. Thus, this allows reducing the interferences, for example, when measuring radio transmissions from the third-party structure or for communications in general when approaching the third-party structure.

Considering the LTE standard, it groups a data block to be transmitted in 12 bands of 15 kHz (according to the OFDM modulation technique). An elementary block in LTE therefore uses a spectrum of 12×15 kHz=180 kHz. The 12 15 kHz bands carrying the data block are called Resource Block" or RB. Next, note that an LTE frame lasts 10 ms. It is divided into 10 subframes each lasting 1 ms. Each subframe is divided into two 0.5 ms slots. One slot therefore lasts 0.5 ms, during which time 7 symbols are transmitted per OFDM band. Since there are 12 OFDM bands, this means that 84 symbols (7 symbols times 12 bands) are transmitted in 0.5 ms. Furthermore, 1 symbol can transmit from 1 bit to 6 bits, depending on the selected modulation (from QPSK modulation to 128 QAM modulation). Finally, the LTE standard allows bandwidths of 1.4 MHz, 3 MHz, 5 MHz, 10 MHz, 15 MHz and 20 MHz to be used. Since a Resource Block (RB) corresponds to a 180 kHz band, it follows that if the communication uses:

a 1.4 MHz band, then 6 RBs can be used;
a 3 MHz band, then 15 RBs can be used;
a 5 MHz band, then 25 RBs can be used;
a 10 MHz band, then 50 RBs can be used;
a 15 MHz band, then 75 RBs can be used; or,
a 20 MHz band, then 100 RBs can be used.

Thus, if the base station has a frequency band 15 MHz wide, then it has 75 RBs, and can therefore transmit up to 75×84 6-bit symbols in 0.5 ms. In other words, 37,800 bits are transmitted in 0.5 ms, i.e. the bit rate is 75.6 Mbps. If the base station has a frequency band 10 MHz wide, it has 50 RBs, and can therefore transmit 50×84 6-bit symbols in 0.5 ms. In other words, 25,200 bits are transmitted in 0.5 ms, i.e. a bit rate of 50.4 Mbps. And so on for the other spectrum widths of the LTE standard frequency bands (i.e. 5 MHz, 3 MHz and 1.4 MHz).

In the embodiments of this invention, the mounted radio scanner measurement means are configured to measure the radiofrequency signal on Resource Blocks not used by the cellular communication links with mobile communication terminals.

Likewise, the control entity can manage the allocation of radio resources in the spectrum based on the information obtained thanks to the scanner and allow cellular communication links with mobile communication terminals only on Resource Blocks not used by the third-party structure and/or the mounted radio scanner.

Figure 2:
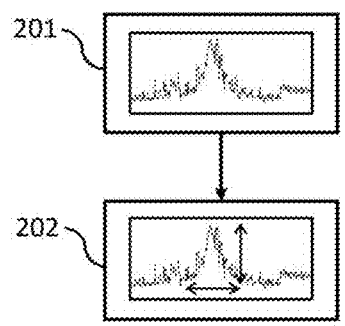
FIG. 2 is a step diagram of an embodiment of a method according to this invention.

Referring to FIG. 2, we will now describe an embodiment of the method according to this invention. The method can be implemented in a continuous manner and thus allow, at each iteration of steps that will be described, to obtain new information associated with the use of the frequency spectrum by a third-party mobile structure, through the mounted radio scanner. The method is implemented in a mobile structure which carries a mounted radio scanner according to that described in FIG. 1.

In a first embodiment of the method, step 201 consists in measuring a radiofrequency signal emitted in the frequency spectrum used for the radio-communications of the radio equipments of the mobile structure. This radiofrequency signal having been emitted by at least one third-party mobile structure which is located in the immediate environment of the mobile structure.

Step 202 then consists of determining, based on physical properties of the measured radiofrequency signal, the information associated with the use of the specific frequency spectrum, for radio transmissions, by the third-party mobile structure. As a reminder, the specific frequency spectrum may be the frequency spectrum used by the base station of the mobile structure for these cellular communications, the frequency spectrum used by a mobile terminal of this mobile structure or a frequency spectrum for use by (and reserved for) one or more mobile structure(s) for all its (their) radio transmissions.

The embodiment of the method previously described applies in particular to the use of a radio scanner whose means of measuring the radiofrequency signal are those of a dedicated device for measuring the radiofrequency signal. However, as already discussed above, referring to FIG. 1, in some cases, the means of measuring the radiofrequency signal are those of a radio equipment of the mobile structure which carries the radio scanner. In these cases, it may be necessary, in order to be able to use the means for measuring the radiofrequency signal efficiently, to interrupt all radio-communications in progress for the radio equipments of said mobile structure. Indeed, these radio-communications are likely to disturb the measurement and may lead to the determination of false information based on this measurement. In particular when the means of measuring the radiofrequency signal used are integrated either in a base station or in one or more mobile communication terminals. In this configuration, radio transmissions from a base station or mobile communication terminal(s) must be stopped before each radio scan operation. Since the method is performed iteratively, each of these radio equipments can then be used alternatively for its radio transmission function or for its radio scanner function.

Thus, in another (non-represented) embodiment, the method comprises a first step during which the radio equipment(s) integrating the radiofrequency signal measuring means interrupt(s) their current radio-communications before the steps of measuring the radiofrequency signal and determining the associated information are implemented. Advantageously, the embodiment of the method does not disturb established radio-communications.

Finally, in another embodiment of the method according to this invention, all the information that is obtained by means of the radio scanner is progressively transmitted to a control entity of the mobile structure which manages and organizes the use of the radio resources made by all the radio equipments located in the immediate environment of the mobile structure. In particular, the use of the radio resources is implemented specifically in a local mode for the communication terminals of the mobile structure. Preferably, the information from several mounted radio scanners, which are each associated with a cell of the local eNodeB can be aggregated locally in order to obtain a coherent local 360° view of the information associated with the use of the specific frequency spectrum by third-party structures.

Then, the control entity can coordinate the establishment of a data link between the base stations involved (i.e. mobile structure and third-party structure(s)).

In general, the control entity 102 of the mobile structure 101 can also be configured to implement a step of identifying the radio resources used by the third-party structure 112 and to reset the cellular communication links with the mobile communication terminals 106a, 106b so not to use the radio resources used by the third-party structure.

Then, the control entity can be configured to identify radio resources, such as a frequency spectrum of a specific width not used by the third-party structure.

Thus, the control entity 102 can be configured to implement a step of resetting cellular communication links with mobile communication terminals so as to use at least part of the free radio resources. Preferably, only free radio resources are used.

Alternatively, the control entity 102 of the mobile structure, is configured to identify the radio resources used by the third-party structure, identify the network used by the third-party structure (e.g. PLMNid—Public Land Mobile Network identifier) and to conFigure the mobile communication terminals in order to stop any transmission of a radiofrequency signal.

Additionally, the control entity 102 on the mobile structure implements a step of allocating part of the free radio resources to the establishment of a backhaul data transport link connecting the mobile structure to the third-party structure. In this case, the free radio resources used for establishing a backhaul data transport link are advantageously different from the free radio resources used for cellular communication links with mobile communication terminals.

Additionally, control unit 102 of the mobile structure can be configured to implement a third-party structure identification step. This third-party structure identification step may include identification of the network used by the third-party structure (e.g. PLMNid identification—Public Land Mobile Network identifier). Advantageously, the control entity 102 of the mobile structure can be configured to implement a comparison of the PLMNid of the third-party structure with a predetermined database of PLMNid. In this context, the step of allocating part of the free radio resources to the establishment of a backhaul data transport link connecting the mobile structure to the third-party structure and more broadly can be conditioned to predetermined authorizations associated with the PLMNid contained in the above-mentioned database.

In embodiments, resetting previously established cellular communication links in an originally used frequency band to a new frequency band using exclusively free radio resources may consist of performing the following steps:

blocking, by the base station, of a Physical Random Access Channel (PRACH), in order to temporarily prevent the reception of requests for radio resource allocation from mobile communication terminals having a cellular communication link with said base station;

detaching the mobile communication terminals having a cellular communication link with the base station from the frequency band used by said base station for its cellular communication links;

reconfiguring the radio resources available by the base station in the new frequency band; and, unblocking the PRACH channel by the base station, thereby enabling the natural re-attachment of mobile communication terminals which request and obtain the establishment of a new cellular communication link with the base station, in the frequency band newly allocated to said base station.

With respect to blocking a PRACH random access channel, this can be performed in several ways. For example, blocking may involve a local RACH management stop at the base station. This would lead to a temporary rejection of any request.

Preferably, it can involve blocking access to the cell reported on the cell system information for the time it takes to perform the reconfiguration. This procedure may be called "Barring Cell". Thus, no terminal can then attempt to reach the PRACH. The use of such a procedure in this particular context can limit overloading the system unnecessarily and increases the autonomy of the terminals.

Furthermore, advantageously, in the context of a cell access block, the method can comprise a consideration of terminal classes. The terminal classes refer in particular to the ACs ("Access Class") configured in the SIM of each terminal. In this context, the method may include, during the PRACH channel unblocking step, the unblocking of only some of the terminal classes in order to make a gradual unblocking and thus avoid congestioning the system.

The control entity 102 of the mobile structure 101 can be configured in particular to implement a step for identifying the radio resources used by the third-party structure 112 and to configure a communication terminal so that it transmits a radiofrequency signal using the radio resources used by the third-party structure 112. Advantageously, this radiofrequency signal is of a higher intensity than the radiofrequency signals used for cellular communication links with mobile communication terminals. For example, this radiofrequency signal may be 2, 4, 8 or 10 times stronger.

Furthermore, as mentioned above, such a control entity may be distributed among several mobile structures and thereby oversee the distribution of radiofrequency resources for all these mobile structures. Thus, advantageously, through the use of the radio scanner, the use of the radio resources, and particularly of the frequency spectrum, made by each radio equipment can be optimized. Each radio equipment, whether it participates in a cellular communication link within a cell or participates in a backhaul data transport link between two structures, can benefit from the maximum possible radio resources without the risk of causing interference.

What is claimed is:

1. A mobile structure of a radio-communication system comprising at least one base station which is configured to establish cellular communication links with mobile communication terminals through a specific radio interface (LTE-Uu), in a specific frequency spectrum, the mobile structure comprising:
   a mounted radio scanner comprising means for measuring a radiofrequency signal transmitted in the specific frequency spectrum, by at least one third-party structure located in an immediate environment of the mobile structure; and,
   a control entity;
   wherein the mounted radio scanner is configured to
      determine, based on physical properties of the radiofrequency signal that is measured, information associated with use of the specific frequency spectrum for radio transmissions transmitted by the at least one third-party structure,
      transmit to the control entity of the mobile structure, information associated with the use of the specific frequency spectrum, for said radio transmissions, by the at least one third-party structure;
   wherein said control entity is configured to
      identify free radio resources, comprising a new frequency spectrum with a width less than the specific frequency spectrum, which are not used by the at least one third-party structure, and
      allocate a portion of the free radio resources to establish a backhaul data transport link connecting the mobile structure to the at least one third-party structure.

2. The mobile structure according to claim 1, wherein the information associated with the use of the specific frequency spectrum by the at least one third-party structure comprises:
   the at least one third-party structure entering or exiting into or out of the immediate environment of the mobile structure;
   moving the at least one third-party structure away from or towards the mobile structure; and,
   one or more frequency bands of the specific frequency spectrum which are used by the at least one third-party structure.

3. The mobile structure according to claim 1, wherein the information associated with the use of the specific frequency spectrum is specific for said radio transmissions transmitted by a base station of the at least one third-party structure.

4. The mobile structure according to claim 1, wherein the means for measuring the radiofrequency signal are configured to measure a radio signal transmitted by a radio relay transmitting predominantly on a down-link (DL) spectrum.

5. The mobile structure according to claim 1, wherein the means for measuring the radiofrequency signal are configured to measure the radiofrequency signal on radio resources not used by the cellular communication links with mobile communication terminals.

6. The mobile structure according to claim 1, further comprising means for identifying said at least one third-party structure located in the immediate environment of the mobile structure, said means for identifying is configured to identify, based on information contained in the radiofrequency signal that is measured, the at least one third-party structure transmitting the radiofrequency signal measured by said means for measuring the radiofrequency signal of said mounted radio scanner.

7. The mobile structure according to claim 6, wherein the information contained in the radiofrequency signal measured by the means for measuring the radiofrequency signal of the mounted radio scanner means and used by the means for identifying comprises one or more of
   a Cell-ID identifier associated with a base station of another mobile structure,
   a Public Land Mobile Network identifier (PLMNid) associated with a mobile communication terminal of said another mobile structure.

8. The mobile structure according to claim 1, further comprising recognition means configured to recognize, based on the information contained in the radiofrequency signal measured by the means for measuring of the mounted radio scanner technological characteristics of the radio transmissions transmitted by the at least one third-party structure, wherein said technological characteristics comprise one or more of a modulation format used, a radio interface used, a protocol used for said radio transmissions.

9. The mobile structure according to claim 1, wherein the control entity of the mobile structure is further configured to identify radio resources used by the at least one third-party structure and to reset the cellular communication links with the mobile communication terminals so as not to use the radio resources used by the at least one third-party structure.

10. The mobile structure according to claim 1, wherein the control entity of the mobile structure is further configured to identify radio resources used by the at least one third-party structure, to identify a network used by the at least one third-party structure and to configure the mobile communication terminals so as to stop any transmission of the radiofrequency signal.

11. A method for using a radio scanner of a mobile structure of a radio-communication system comprising at least one base station which is configured to establish cellular communication links with mobile communication terminals through a specific radio interface (LTE-Uu), in a specific frequency spectrum, the mobile structure comprising
   a mounted radio scanner comprising means for measuring a radiofrequency signal, and
   a control entity,
said method comprising:
   via said mounted radio scanner comprising means for measuring the radiofrequency signal measuring the radiofrequency signal transmitted in the specific frequency spectrum by at least one third-party structure, located in an immediate environment of the mobile structure; and, determining, based on physical properties of the radiofrequency signal that is measured, information associated with use of the specific frequency spectrum for radio transmissions transmitted by the at least one third-party structure;

transmitting to the control entity of the mobile structure, information associated with the use of the specific frequency spectrum, for said radio transmissions, by the at least one third-party structure;

via said control entity identifying free radio resources, comprising a new frequency spectrum with a width less than the specific frequency spectrum, which are not used by the at least one third-party structure; and, allocating a portion of the free radio resources to establish a backhaul data transport link connecting the mobile structure to the at least one third-party structure.

12. The method for using a radio scanner according to claim 11, further comprising, via said control entity, allocating radio resources dedicated to the mounted radio scanner, wherein said allocating said radio resources is implemented prior to said measuring and said determining, wherein said radio resources dedicated to the mounted radio scanner are not being used for radio-communications between the at least one base station of the mobile structure and the mobile communication terminals of the mobile structure.

* * * * *